(12) United States Patent
Sammour et al.

(10) Patent No.: US 9,648,480 B2
(45) Date of Patent: *May 9, 2017

(54) METHOD AND APPARATUS TO DELIVER PUBLIC WARNING MESSAGES

(71) Applicant: INTERDIGITAL PATENT HOLDINGS, INC., Wilmington, DE (US)

(72) Inventors: Mohammed Sammour, Alrabieh Amman (JO); Rajat P. Mukherjee, Toronto (CA); Shankar Somasundaram, Sunnyvale, CA (US); Ulises Olvera-Hernandez, Kirkland (CA); Juan Carlos Zuniga, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,831

(22) Filed: Sep. 4, 2015

(65) Prior Publication Data
US 2015/0382168 A1    Dec. 31, 2015

Related U.S. Application Data

(63) Continuation of application No. 14/092,259, filed on Nov. 27, 2013, now Pat. No. 9,167,402, which is a
(Continued)

(51) Int. Cl.
*H04W 4/22* (2009.01)
*H04W 76/00* (2009.01)
(Continued)

(52) U.S. Cl.
CPC ........... *H04W 4/22* (2013.01); *H04L 12/1895* (2013.01); *H04W 4/02* (2013.01); *H04W 4/12* (2013.01);
(Continued)

(58) Field of Classification Search
CPC ..... H04W 4/22; H04W 68/02; H04W 76/007; H04W 4/12; H04W 4/02; H04W 84/12;
(Continued)

(56) References Cited

U.S. PATENT DOCUMENTS

2002/0141331 A1  10/2002  Mate et al.
2003/0069855 A1   4/2003  Hormann et al.
(Continued)

FOREIGN PATENT DOCUMENTS

CN     1894949 A    1/2007
CN   101088111 A   12/2007
(Continued)

OTHER PUBLICATIONS

3GPP TS 25.331 V8.1.0 (Dec. 2007).*
(Continued)

*Primary Examiner* — Kan Yuen
*Assistant Examiner* — Richard Chang
(74) *Attorney, Agent, or Firm* — Condo Roccia Koptiw LLP

(57) ABSTRACT

A method and apparatus for a wireless transmit receive unit (WTRU) to receive an emergency situation notification. The method and apparatus include the WTRU receiving a paging message with an emergency situation notification, and the WTRU receiving scheduling information in a system information block.

20 Claims, 7 Drawing Sheets

Related U.S. Application Data continuation of application No. 12/402,005, filed on Mar. 11, 2009, now Pat. No. 8,599,802.

(60) Provisional application No. 61/036,893, filed on Mar. 14, 2008.

(51) Int. Cl.

| | | |
|---|---|---|
| *H04W 84/12* | (2009.01) | |
| *H04W 84/18* | (2009.01) | |
| *H04W 4/02* | (2009.01) | |
| *H04W 4/12* | (2009.01) | |
| *H04W 68/02* | (2009.01) | |
| *H04L 12/18* | (2006.01) | |
| *H04W 88/02* | (2009.01) | |
| *H04W 88/08* | (2009.01) | |

(52) U.S. Cl.
CPC ......... *H04W 68/02* (2013.01); *H04W 76/007* (2013.01); *H04W 84/12* (2013.01); *H04W 84/18* (2013.01); *H04W 88/02* (2013.01); *H04W 88/08* (2013.01)

(58) Field of Classification Search
CPC ..... H04W 84/18; H04W 88/02; H04W 88/08; H04L 12/1895
USPC ........................................................ 370/338
See application file for complete search history.

(56) References Cited

U.S. PATENT DOCUMENTS

| | | | |
|---|---|---|---|
| 2003/0157923 A1* | 8/2003 | Tani ................. | H04M 11/04 455/404.1 |
| 2005/0037728 A1 | 2/2005 | Binzel et al. | |
| 2005/0153700 A1* | 7/2005 | Farnsworth .......... | H04W 48/16 455/446 |
| 2006/0135091 A1 | 6/2006 | Ntsonde et al. | |
| 2006/0136091 A1 | 6/2006 | Browne | |
| 2006/0281456 A1 | 12/2006 | Roberts et al. | |
| 2007/0032219 A1* | 2/2007 | Rudolf ................ | H04W 4/22 455/404.1 |
| 2007/0049344 A1 | 3/2007 | Van Der Velde et al. | |
| 2008/0076386 A1 | 3/2008 | Khetawat et al. | |
| 2008/0261554 A1 | 10/2008 | Keller et al. | |
| 2009/0239498 A1 | 9/2009 | Lee et al. | |
| 2009/0253401 A1 | 10/2009 | Lee et al. | |
| 2010/0026472 A1 | 2/2010 | Kitazoe | |
| 2010/0035574 A1 | 2/2010 | Punz | |
| 2010/0183031 A1 | 7/2010 | Dalsgaard et al. | |
| 2010/0233990 A1 | 9/2010 | Kitahara et al. | |

FOREIGN PATENT DOCUMENTS

| | | |
|---|---|---|
| EP | 1209886 A2 | 5/2002 |
| EP | 1672942 A1 | 6/2006 |
| JP | 2007/180628 A | 7/2007 |
| JP | 2009-513047 A | 3/2009 |
| KR | 10-2003-0069855 A | 8/2003 |
| WO | WO 2006/066629 A1 | 6/2006 |
| WO | WO 2007/045564 A1 | 4/2007 |
| WO | WO 2007/148703 A1 | 12/2007 |

OTHER PUBLICATIONS

3rd Generation Partnership Project (3GPP), R2-083451, "Introduction of Paging Enhancement for ETWS", NTT DoCoMo, 3GPP TSG-RAN-WG2 Meeting #62bis, Warsaw, Poland, Jun. 30-Jul. 4, 2008, 3 pages.
3rd Generation Partnership Project (3GPP), R2-084791, "Miscellaneous Corrections and Clarifications", Rapporteur (Samsung), TSG-RAN2#63 Meeting, Jeju, South Korea, Aug. 18-22, 2008, 207 pages.
3rd Generation Partnership Project (3GPP), R3-080061, "Support of Text-Based Broadcast Messages", NTT DoCoMo, Inc., 3GPP TSG-RAN WG3 #59, Sorrento, Italy, Feb. 11-15, 2008, 5 pages.
3rd Generation Partnership Project (3GPP), R3-080508, "LTE ETWS Architecture", Nokia, Nokia Siemens Networks, 3GPP TSG-RAN WG3 Meeting #59, Sorrento, Italy, Feb. 11-15, 2008, 2 pages.
3rd Generation Partnership Project (3GPP), SP-070876, "Proposed new WID on Public Warning System (PWS) Requirements", 3GPP TSG-SA Meeting #38, Cancun, Mexico, Dec. 2007, 3 pages.
3rd Generation Partnership Project (3GPP), TS 23.041 V7.0.0, "Technical Specification Group Terminals, Technical Realization of Cell Broadcast Service (CBS) (Release 7)", Mar. 2003, pp. 1-36.
3rd Generation Partnership Project (3GPP), TS 23.041 V8.1.0, "Technical Specification Group Core Network and Terminals, Technical Realization of Cell Broadcast Service (CBS) (Release 8)", Dec. 2008, pp. 1-41.
3rd Generation Partnership Project (3GPP), TS 23.101 V8.0.0, "Technical Specification Group Services and System Aspects, General Universal Mobile Telecommunications System (UMTS) Architecture (Release 8)", Dec. 2008, pp. 1-14.
3rd Generation Partnership Project (3GPP), TS 24.002 V3.1.1, "Technical Specification Group Core Network, GSM—UMTS Public Land Mobile Network (PLMN) Access Reference Configuration (Release 1999)", Jun. 2003, pp. 1-11.
3rd Generation Partnership Project (3GPP), TS 24.002 V4.1.1, "Technical Specification Group Core Network, GSM—UMTS Public Land Mobile Network (PLMN) Access Reference Configuration (Release 4)", Jun. 2003, pp. 1-11.
3rd Generation Partnership Project (3GPP), TS 24.002 V5.1.1, "Technical Specification Group Core Network, GSM—UMTS Public Land Mobile Network (PLMN) Access Reference Configuration (Release 5)", Jun. 2003, pp. 1-11.
3rd Generation Partnership Project (3GPP), TS 24.002 V6.0.0, "Technical Specification Group Core Network, GSM—UMTS Public Land Mobile Network (PLMN) Access Reference Configuration (Release 6)", Dec. 2004, pp. 1-11.
3rd Generation Partnership Project (3GPP), TS 24.002 V7.0.0, "Technical Specification Group Core Network, GSM—UMTS Public Land Mobile Network (PLMN) Access Reference Configuration (Release 7)", Jun. 2007, pp. 1-11.
3rd Generation Partnership Project (3GPP), TS 24.002 V8.0.0, "Technical Specification Group Core Network, GSM—UMTS Public Land Mobile Network (PLMN) Access Reference Configuration (Release 8)", Dec. 2008, pp. 1-11.
3rd Generation Partnership Project (3GPP), TS 25.331 V3.21.0, "Technical Specification Group Radio Access Network, Radio Resource Control (RRC) Protocol Specification (Release 1999)", Dec. 2004, pp. 1-879.
3rd Generation Partnership Project (3GPP), TS 25.331 V4.18.0, "Technical Specification Group Radio Access Network, Radio Resource Control (RRC), Protocol Specification (Release 4)", Dec. 2007, pp. 1-953.
3rd Generation Partnership Project (3GPP), TS 25.331 V4.20.0, "Technical Specification Group Radio Access Network, Radio Resource Control (RRC), Protocol Specification (Release 4)", Dec. 2008, pp. 1-967.
3rd Generation Partnership Project (3GPP), TS 25.331 V5.21.0, "Technical Specification Group Radio Access Network, Radio Resource Control (RRC), Protocol Specification (Release 5)", Dec. 2007, pp. 1-1045.
3rd Generation Partnership Project (3GPP), TS 25.331 V5.23.0, "Technical Specification Group Radio Access Network, Radio Resource Control (RRC), Protocol Specification (Release 5)", Dec. 2008, pp. 1-1046.
3rd Generation Partnership Project (3GPP), TS 25.331 V6.16.0, "Technical Specification Group Radio Access Network, Radio Resource Control (RRC), Protocol Specification (Release 6)", Dec. 2007, pp. 1-1252.

(56) References Cited

OTHER PUBLICATIONS

3rd Generation Partnership Project (3GPP), TS 25.331 V6.20.0, "Technical Specification Group Radio Access Network, Radio Resource Control (RRC), Protocol Specification (Release 6)", Dec. 2008, pp. 1-1252.
3rd Generation Partnership Project (3GPP), TS 25.331 V7.11.0, "Technical Specification Group Radio Access Network, Radio Resource Control (RRC), Protocol Specification (Release 7)", Dec. 2008, pp. 1-1482.
3rd Generation Partnership Project (3GPP), TS 25.331 V7.7.0, "Technical Specification Group Radio Access Network, Radio Resource Control (RRC), Protocol Specification (Release 7)", Dec. 2007, pp. 1-1469.
3rd Generation Partnership Project (3GPP), TS 25.331 V8.5.0, "Technical Specification Group Radio Access Network, Radio Resource Control (RRC), Protocol Specification (Release 8)", Dec. 2008, pp. 1-1646.
3rd Generation Partnership Project (3GPP), TS 27.005 V3.2.0, "Technical Specification Group Terminals, Use of Data Terminal Equipment-Data Circuit Terminating, Equipment (DTE—DCE) Interface for Short Message Service (SMS) and Cell Broadcast Service (CBS) (Release 1999)", Jun. 2002, pp. 1-67.
3rd Generation Partnership Project (3GPP), TS 27.005 V4.2.1, "Technical Specification Group Terminals, Use of Data Terminal Equipment—Data Circuit Terminating Equipment (DTE—DCE) Interface for Short Message Service (SMS) and Cell Broadcast Service (CBS) (Release 4)", Jan. 2005, pp. 1-69.
3rd Generation Partnership Project (3GPP), TS 27.005 V5.0.1, "Technical Specification Group Terminals, Use of Data Terminal Equipment—Data Circuit Terminating Equipment (DTE—DCE) Interface for Short Message Service (SMS) and Cell Broadcast Service (CBS) (Release 5)", Jan. 2005, pp. 1-69.
3rd Generation Partnership Project (3GPP), TS 27.005 V6.0.1, "Technical Specification Group Terminals, Use of Data Terminal Equipment—Data Circuit Terminating Equipment (DTE—DCE) Interface for Short Message Service (SMS) and Cell Broadcast Service (CBS) (Release 6)", Jan. 2005, pp. 1-69.
3rd Generation Partnership Project (3GPP), TS 27.005 V7.0.0, "Technical Specification Group Core Network and Terminals, Use of Data Terminal Equipment—Data Circuit Terminating Equipment (DTE—DCE) Interface for Short Message Service (SMS) and Cell Broadcast Service (CBS) (Release 7)", Mar. 2006, pp. 1-69.
3rd Generation Partnership Project (3GPP), TS 27.005 V8.0.0, "Technical Specification Group Core Network and Terminals, Use of Data Terminal Equipment—Data Circuit Terminating Equipment (DTE—DCE) Interface for Short Message Service (SMS) and Cell Broadcast Service (CBS) (Release 8)", Mar. 2008, pp. 1-68.
3rd Generation Partnership Project (3GPP), TS 27.007 V8.2.0, "Technical Specification Group Core Network and Terminals, AT Command Set for User Equipment (UE) (Release 8)", Dec. 2007, pp. 1-186.
3rd Generation Partnership Project (3GPP), TS 27.007 V8.6.0, "Technical Specification Group Core Network and Terminals, AT Command Set for User Equipment (UE) (Release 8)", Dec. 2008, pp. 1-213.
3rd Generation Partnership Project (3GPP), TS 36.300 V8.3.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Dec. 2007, pp. 1-121.
3rd Generation Partnership Project (3GPP), TS 36.300 V8.7.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Dec. 2008, pp. 1-144.
3rd Generation Partnership Project (3GPP), TS 36.321 V8.0.0, "Technical Specification Group Radio Access Network, Evolved Universal Terrestrial Radio Access (E-UTRA) Medium Access Control (MAC) Protocol Specification (Release 8)", Dec. 2007, pp. 1- 23.
3rd Generation Partnership Project (3GPP), TS 36.321 V8.4.0, "Technical Specification Group Radio Access Network, Evolved Universal Terrestrial Radio Access (E-UTRA) Medium Access Control (MAC) Protocol Specification (Release 8)", Dec. 2008, pp. 1-43.
3rd Generation Partnership Project (3GPP), TS 36.331 V0.5.0, "Technical Specification Group Radio Access Network, Evolved Universal Terrestrial Radio Access (E-UTRA) Radio Resource Control (RRC), Protocol Specification (Release 8)", Nov. 2007.
3rd Generation Partnership Project (3GPP), TS 36.331 V8.0.0, "Technical Specification Group Radio Access Network, Evolved Universal Terrestrial Radio Access (E-UTRA) Radio Resource Control (RRC), Protocol Specification (Release 8)", Dec. 2007, pp. 1-56.
3rd Generation Partnership Project (3GPP), TS 36.331 V8.1.0, "Technical Specification Group Radio Access Network, Evolved Universal Terrestrial Radio Access (E-UTRA) Radio Resource Control (RRC), Protocol Specification (Release 8)", Mar. 2008, pp. 1-122.
3rd Generation Partnership Project (3GPP), TS 36.331 V8.4.0, "Technical Specification Group Radio Access Network, Evolved Universal Terrestrial Radio Access (E-UTRA) Radio Resource Control (RRC) Protocol Specification (Release 8)", Dec. 2008, pp. 1-198.
3rd Generation Partnership Project (3GPP), TS 36.331 V9.3.0, "Technical Specification Group Radio Access Network, Evolved Universal Terrestrial Radio Access (E-UTRA), Radio Resource Control (RRC), Protocol Specification (Release 9)", Jun. 2010, pp. 1-250.
3rd Generation Partnership Project (3GPP), TR 23.828 V0.1.0, "Technical Specification Group Services and System Aspects, Earthquake and Tsunami Warning System Requirements and Solutions (ETWS), Solution Placeholder (Release 8)", Jan. 2008, pp. 1-17.
3rd Generation Partnership Project (3GPP), TS 22.168 V1.2.1, "Technical Specification Group Services and System Aspects, Earthquake and Tsunami Warning System (ETWS) Requirements, Stage 1 (Release 8)", Jan. 2008, pp. 1-12.
European Telecommunications Standards Institute (ETSI), TS 125 331 V8.1.0, "Universal Mobile Telecommunications System (UMTS), Radio Resource Control (RRC), Protocol Specification (3GPP TS 25.331 version 8.1.0 Release 8)", Jan. 2008, pp. 1-1468.
$3^{rd}$ Generation Partnership Project (3GPP), R2-080396, "Way forward for ETWS", NTT DoCoMO, 3GPP TSG-RAN-WG2, Meeting #60 bis, Sevilla, Spain, Jan. 14-18, 2008, 4 pages.
$3^{rd}$ Generation Partnership Project (3GPP), TSGS#38(70)0815, "Updated WID: Earthquake and Tsunami Warning System Requirements and Solutions (ETWS)",Technical Specification Group Services and System Aspects, Meeting # 38, Cancun, Mexico, Dec. 3-6, 2007, 4 pages.

* cited by examiner

METHOD AND APPARATUS TO DELIVER PUBLIC WARNING MESSAGES

CROSS REFERENCE TO RELATED APPLICATIONS

This application is a continuation of U.S. patent application Ser. No. 14/092,259, filed Nov. 27, 2013, which is continuation of U.S. patent application Ser. No. 12/402,005, filed Mar. 11, 2009, issuing as U.S. Pat. No. 8,599,802 on Dec. 3, 2013, which claims the benefit of U.S. Provisional Patent Application No. 61/036,893 filed Mar. 14, 2008, which are incorporated by reference as if fully set forth herein.

FIELD OF INVENTION

This application is related to wireless communications.

BACKGROUND

The Third Generation Partnership Project (3GPP) has initiated the Long Term Evolution (LTE) program to bring new technology, new network architecture, new configurations and new applications and services to wireless networks in order to provide improved spectral efficiency and faster user experiences.

There are many man-made and natural emergencies that may cause considerable damage over a wide-spread area. Hurricanes, typhoons, tornados, floods, chemical spills and explosions, for example, may cause significant loss of life and property. While certain governments and commercial agencies currently provide warnings via siren, radio and/or television, a public warning system incorporated in a wireless transmit receive unit (WTRU) in an LTE network may increase the probability that a large number of people may be forewarned of these dangers.

FIG. 1 shows an LTE control-plane protocol stack 100 in accordance with the prior art. The protocol stack 100 may be located in a WTRU 102 and an eNode B (eNB) 120. The stack includes the radio resource control (RRC) 104, 124, the packet data control protocol (PDCP) 106, 126, the radio link control (RLC) 108, 128, the medium access control (MAC) 110, 130 and the physical layer (PHY) 112, 132. The non-access stratum (NAS) 114, 144 may also reside in the WTRU 102 and a mobility management entity (MME) 140.

FIG. 2 shows an LTE user-plane protocol stack 200 in accordance with the prior art. The user-plane protocol stack 200 may reside in a WTRU 202 and an eNB 222. The user-plane protocol stack 200 may include the PDCP 204, 224, the RLC 206, 226, the MAC 208, 218 and the physical layer 210, 230.

In an LTE communication system, a WTRU and eNB may share operating parameters in order to communicate properly. One way for the eNB to inform the WTRU about operating parameters is for the eNB to transmit system information to the WTRU. System information is public information about how a WTRU communicates with a cell, such as transmission bandwidth, channel configurations, cell loading and power control parameters, for example.

There may be a relatively large amount of system information transmitted by an eNB in a cell. Therefore, in order to organize the transmission of the system information, the information may be divided into a number of system information blocks (SIBs). The types of the system information carried in a particular SIB is constant, but the value of the information carried in each SIB is subject to change.

Some SIBs may have the same scheduling requirements, such as periodicity. There may be more than one system information (SI) message transmitted with the same periodicity. Each SIB may contain a set of related SI parameters. Several SIBs have been defined in the prior art, including, for example, a Master Information Block (MIB). The MIB may include a limited number of frequently transmitted parameters. Another defined SIB is SIB type-1. SIB type-1 may contain scheduling information and may include indicators as to when SI messages are transmitted. System information master (SI-M) and system information 1 (SI-1) are special versions of an SI message only carrying a single SIB, namely the MIB and SIB type 1, respectively. The SI-M message is carried on a Broadcast Channel (BCH) while all other SI messages are carried on a downlink shared channel (DL-SCH). The system information carried on BCH is contained in the MIB. All other system information is carried on a DL-SCH.

A paging message may be used to inform a WTRU in RRC_IDLE state about a change in system information. A WTRU in RRC_CONNECTED state may monitor a physical downlink control channel (PDCCH) on a periodic basis and at a time specifically defined for this purpose. If a WTRU detects the system information change RNTI (Radio Network Temporary Identifier) on the PDCCH, the WTRU may determine that a system information change will occur at a next modification period boundary.

The SI-1 message includes a value tag that may indicate if a change has occurred in the system information other than the SI-M and SI-1. A WTRU may use this value tag upon returning from out of coverage to verify if the previously acquired system information is still valid. A WTRU may consider system information to be valid for at most 6 hours from the moment it was received.

FIG. 3 shows a functional model for a WTRU 300 in accordance with the prior art. The interface between a WTRU 300 and a network is the radio interface. A WTRU 300 may be divided into a number of domains, the domains being separated by reference points. Some defined domains are the universal subscriber identity module (USIM) domain 302 and mobile equipment (ME) domain 304. The ME domain 304 may be further divided into several components showing the connectivity between multiple functional groups. These groups may be implemented in one or more hardware devices. An example of such connectivity is the terminal equipment (TE) 306 to mobile termination (MT) 308 interface.

FIG. 4 is a block diagram of physical components 400 mapped to the functional diagram 300 of FIG. 3. The universal integrated circuit card (UICC) 402 may be a physical implementation of the USIM 302 of FIG. 3. The remainder of the WTRU 404 may physically represent the MT 308 of FIG. 3, and a personal computer 406 may physical embody the TE 306 of FIG. 3.

"Attention" (AT) commands may be used for controlling MT functions and GSM/Universal Mobile Telecommunication System (UMTS) network services from a terminal equipment (TE) through a terminal adaptor (TA). The use of AT commands assumes an abstract architecture. FIG. 5 shows a block diagram of an abstract architecture 500 that may incorporate AT commands. The architecture 500 includes a TE 502, an MT 506 and a TA 504 used as an interface between the TE 502 and the MT 506. The TE 502 may be a computer, for example. The MT 506 may send MT status messages 508 to the TA 504 and receive MT control messages 510 from the TA 504. The TE 502 may send AT commands 512 to the TA 504 and receive responses 514 from the TA 504. As shown in FIG. 5, the TA 504, the MT 506 and the TE 502 are separate entities. However, the TA 504 may be integrated under the MT 506 while the TE 502 is implemented as a separate entity (configuration not shown). Also, the TA 504 may be integrated under the TE 502, with the MT 506 implemented as a separate entity (configuration not shown). Lastly, the TA 504 and the MT 506 may both be integrated under the TE 502 as a single entity (configuration not shown).

SUMMARY

A method and apparatus are disclosed for a WTRU to receive an emergency situation notification. The method and apparatus may include the WTRU receiving a paging message with an emergency situation notification and the WTRU receiving scheduling information in a system information block. The WTRU may also receive emergency situation information in another system information block.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes, but is not limited to, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes, but is not limited to, a Node-B, a site controller, an access point (AP), or any other type of interfacing device capable of operating in a wireless environment.

Figure 1:
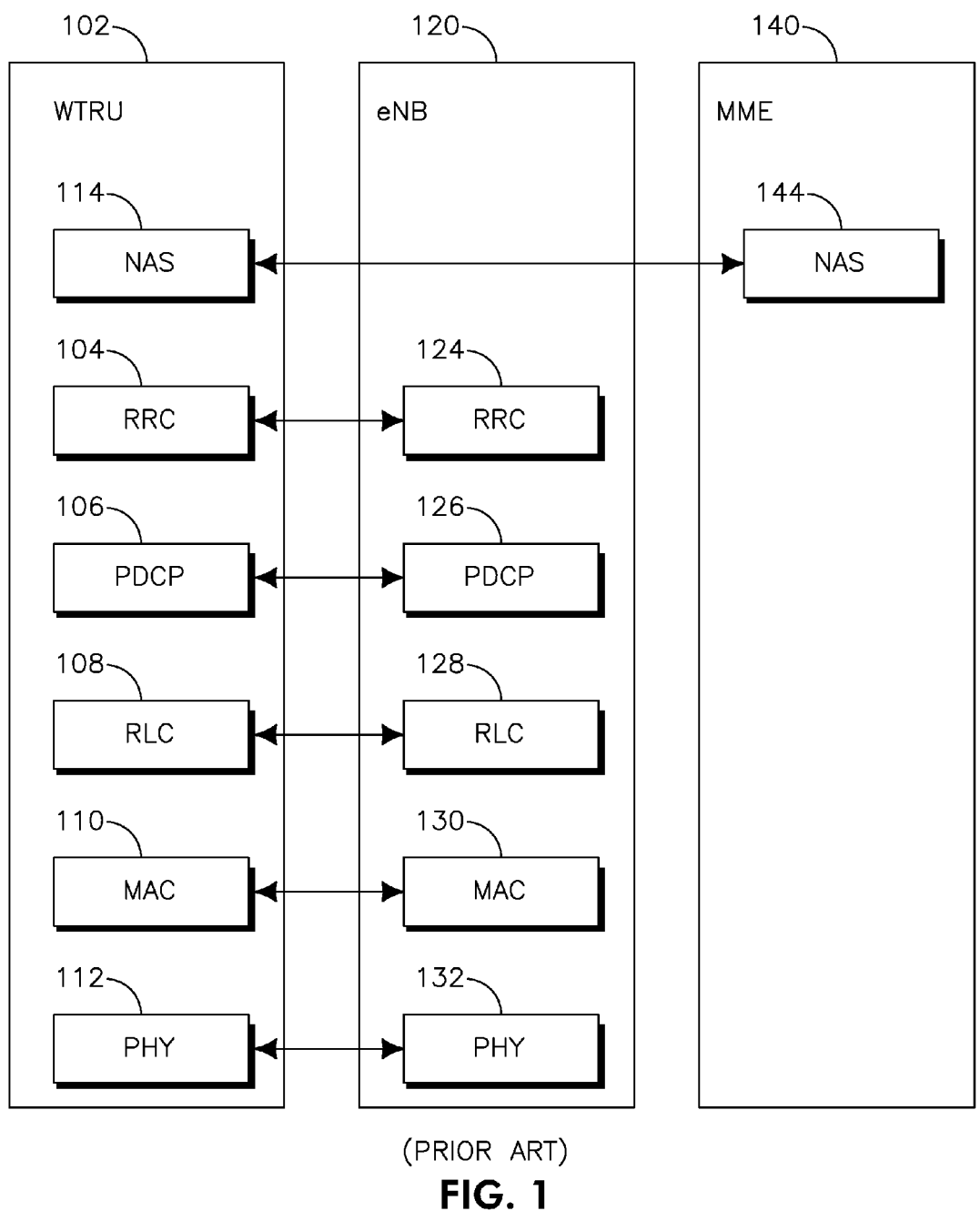
FIG. 1 shows an LTE control-plane protocol stack in accordance with the prior art.
Figure 2:
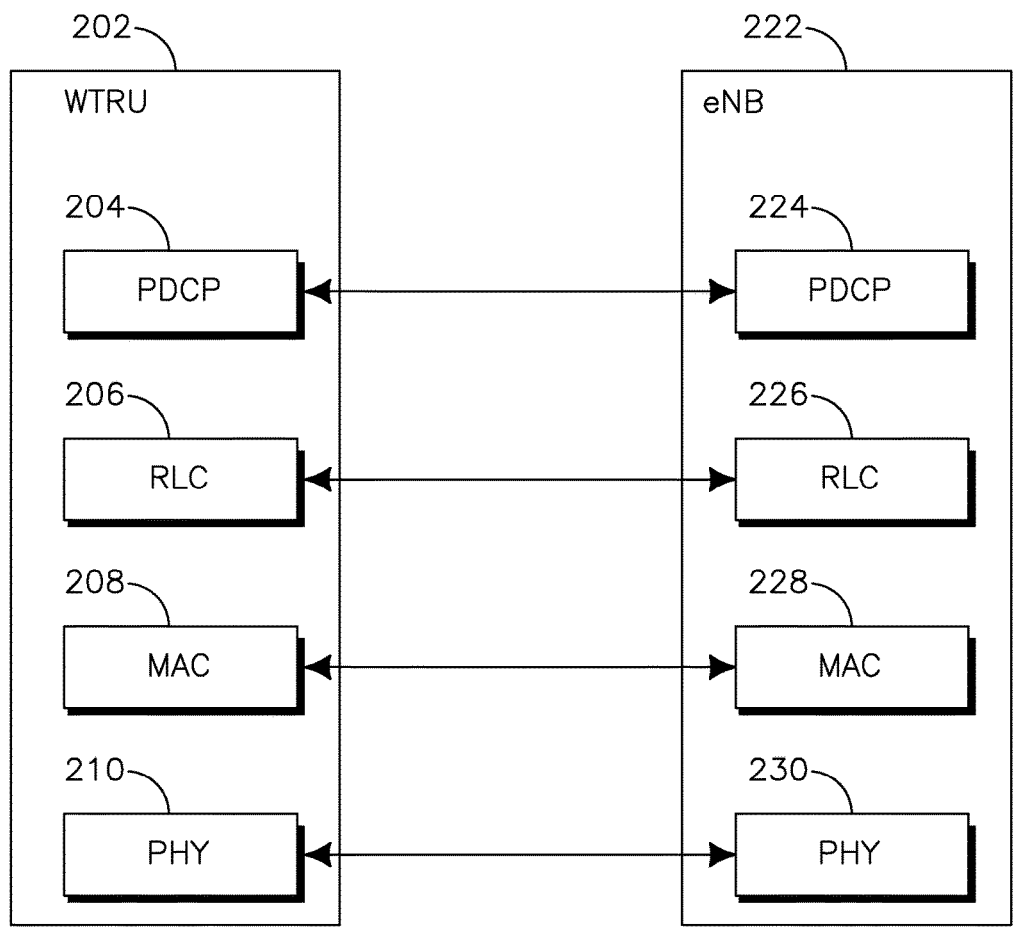
FIG. 2 shows an LTE user-plane protocol stack in accordance with the prior art.
Figure 3:
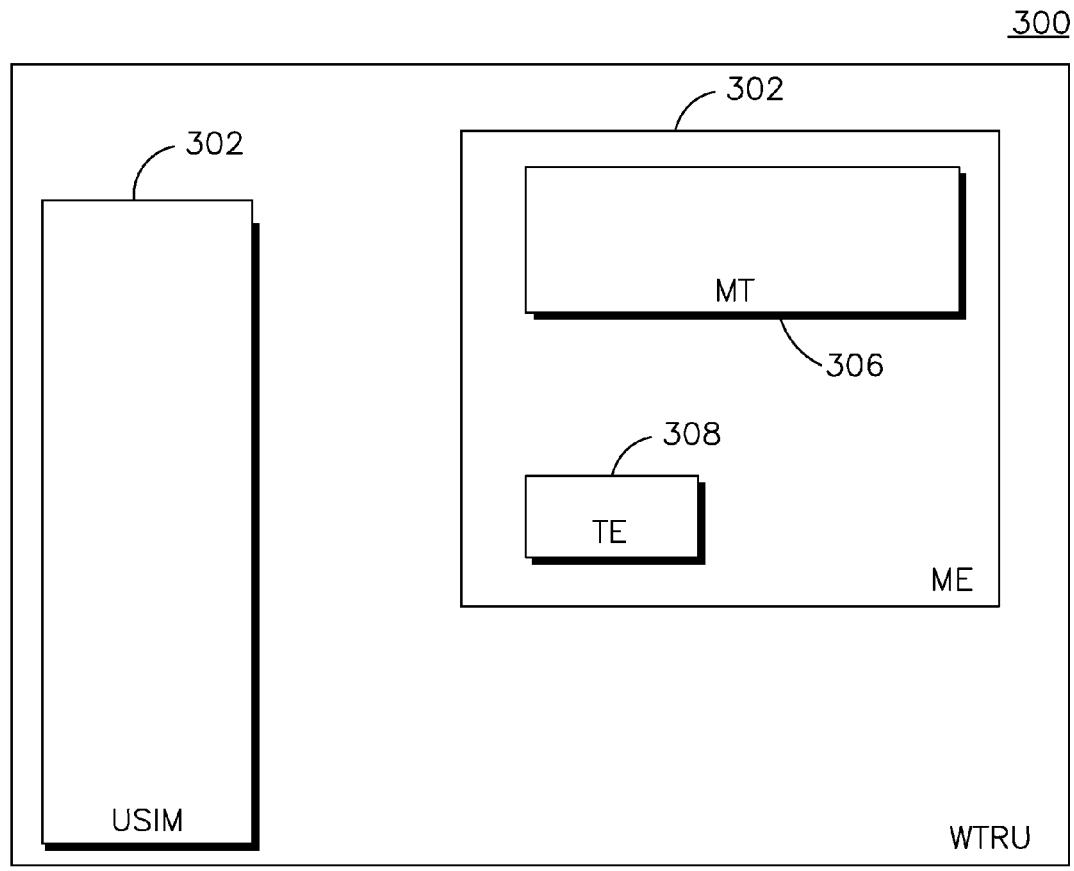
FIG. 3 shows a functional model for a WTRU in accordance with the prior art.
Figure 4:
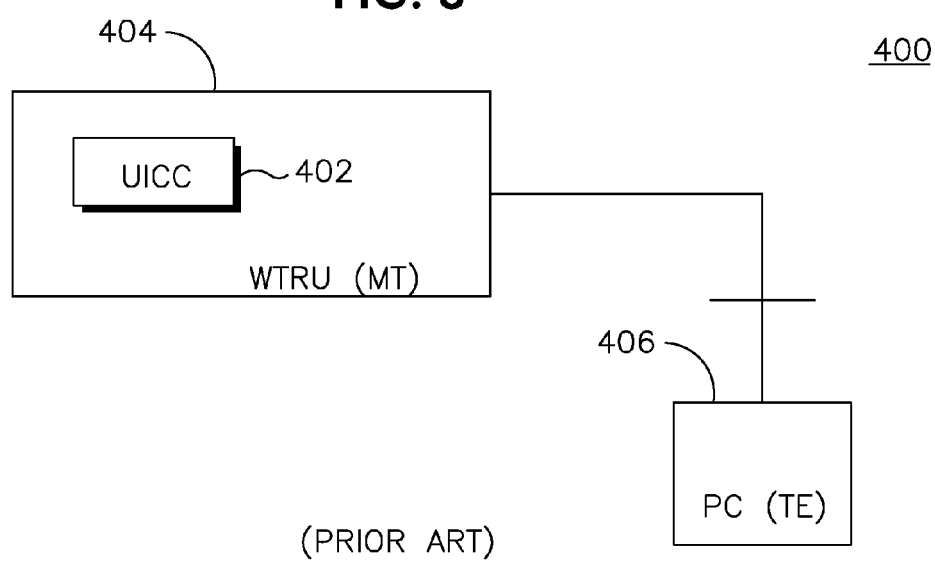
FIG. 4 is a block diagram of physical components mapped to the functional diagram of FIG. 3.
Figure 5:
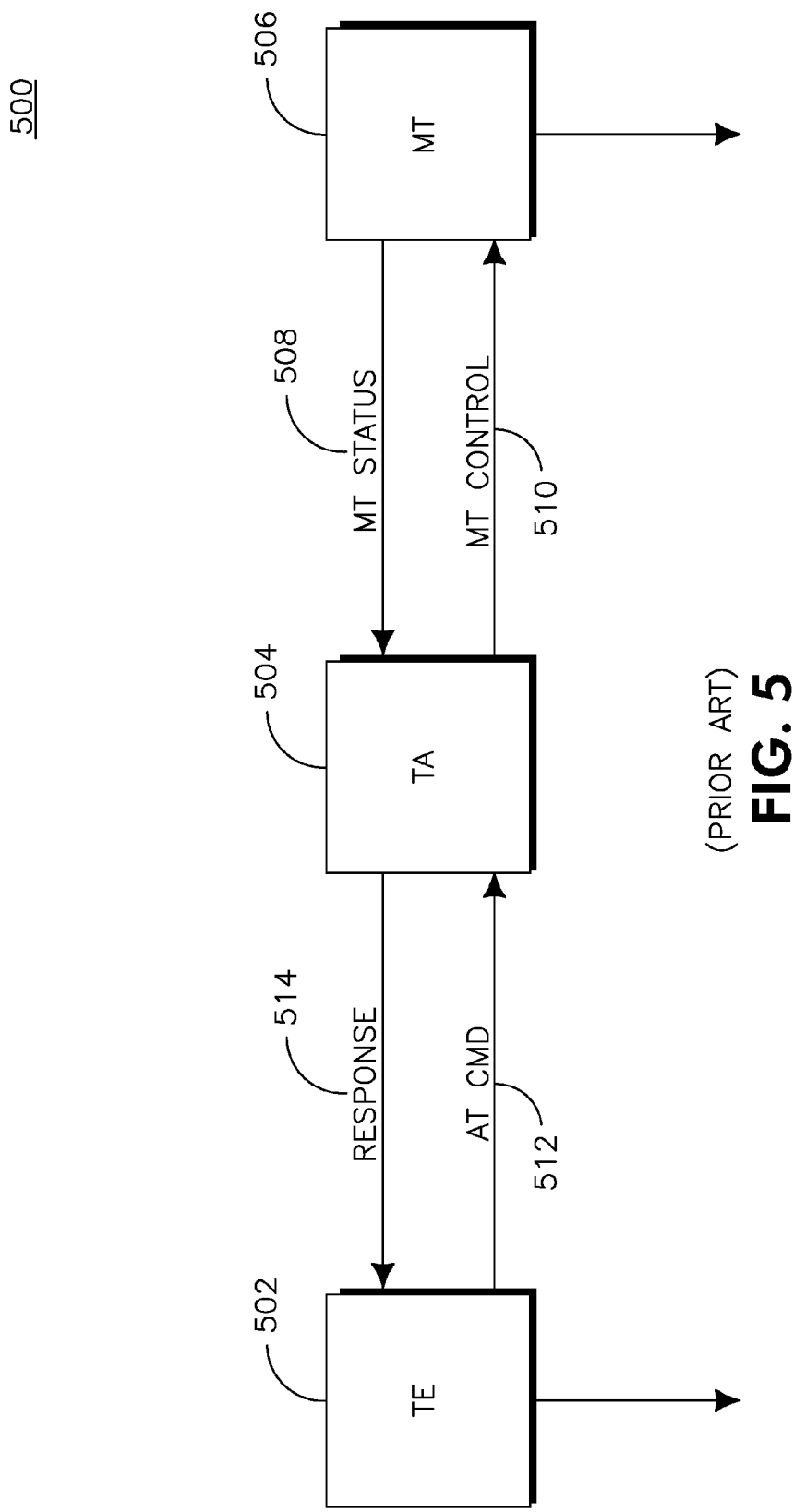
FIG. 5 shows a block diagram of an abstract architecture incorporating AT commands in accordance with the prior art.
Figure 6:
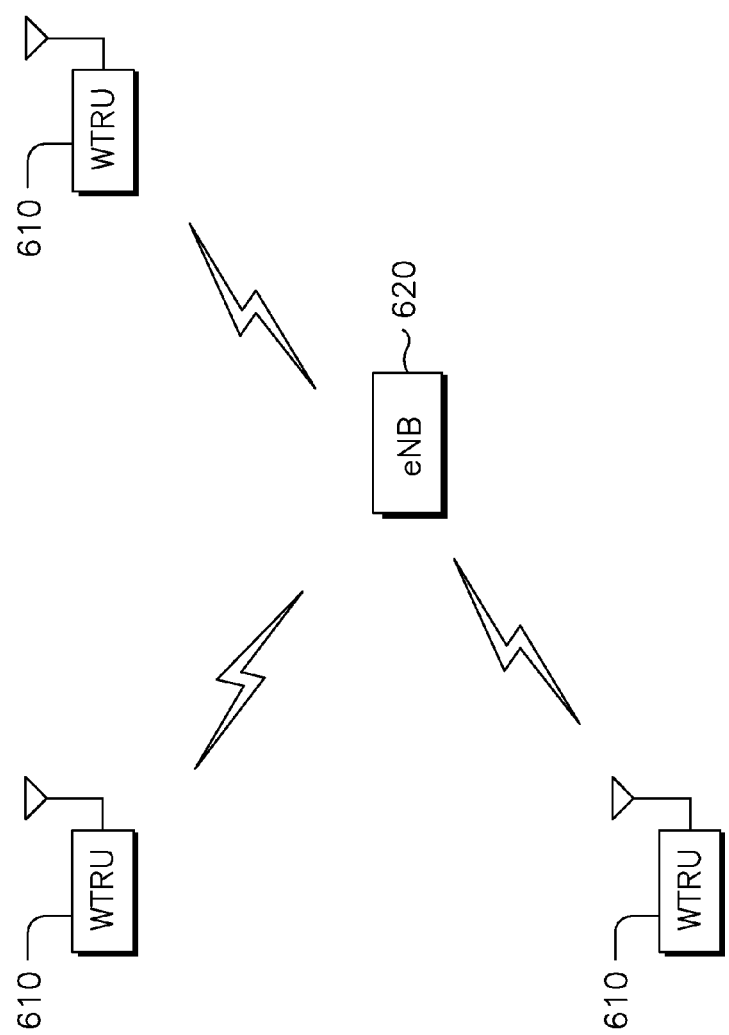
FIG. 6 shows a wireless communication system in accordance with one embodiment.

FIG. 6 shows a wireless communication system 600 including a plurality of WTRUs 610 and an eNB 620. As shown in FIG. 6, the WTRUs 610 are in communication with the eNB 620. Although three WTRUs 610 and one eNB 620 are shown in FIG. 6, it should be noted that any combination of wireless and wired devices may be included in the wireless communication system 600.

Figure 7:
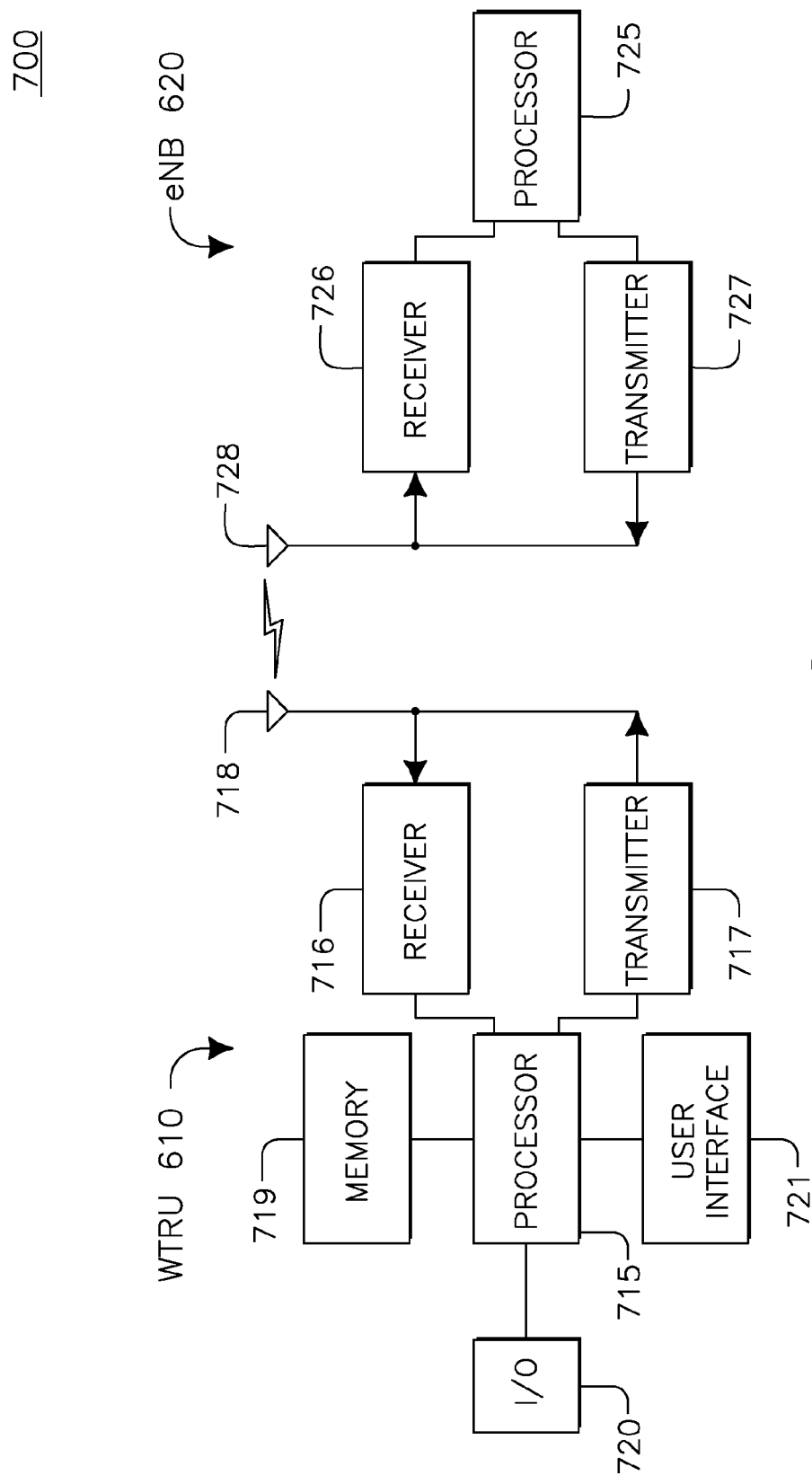
FIG. 7 is a functional block diagram of a WTRU and the eNB of the wireless communication system of FIG. 6.

FIG. 7 is a functional block diagram 700 of the WTRU 610 and the eNB 620 of the wireless communication system 600 of FIG. 6. As shown in FIG. 6, the WTRU 610 is in communication with the eNB 620. The WTRU 610 is configured to receive system information and system information change notification from the eNB 620. The WTRU 610 is also configured to transmit and receive RRC messages and information elements. The eNB 620 may be configured to transmit, and the WTRU 610 may be configured to receive and monitor signals on the broadcast control channel (BCCH). The WTRU 610 may be configured to receive paging messages and other downlink signaling.

In addition to the components that may be found in a typical WTRU, the WTRU 610 includes a processor 715, a receiver 716, a transmitter 717, and an antenna 718. The WTRU 610 may also include a user interface 721, which may include, but is not limited to, an LCD or LED screen, a touch screen, a keyboard, a stylus, or any other typical input/output device. The WTRU 610 may also include memory 719, both volatile and non-volatile as well as interfaces 720 to other devices, such as universal serial bus (USB) ports, serial ports and the like. The receiver 716 and the transmitter 717 are in communication with the processor 715. The antenna 718 is in communication with both the receiver 716 and the transmitter 717 to facilitate the transmission and reception of wireless data.

In addition to the components that may be found in a typical eNB, the eNB 620 includes a processor 725, a receiver 726, a transmitter 727, and an antenna 728. The receiver 726 and the transmitter 727 are in communication with the processor 725. The antenna 728 is in communication with both the receiver 726 and the transmitter 727 to facilitate the transmission and reception of wireless data.

RRC system information may be utilized to inform WTRUs of emergency situations. The warning may be distributed to all eNBs in a network. The RRC layer may place a warning in one or more SIB, or the MIB. The SIB or MIB may include:
  a. notification of an emergency;
  b. a code or value that is mapped to a particular situation;
  c. a text message describing the emergency and recommended action to take;
  d. a call back phone number for more information;
  e. an internet address for more information;
  f. location information of the WTRU or the user;
  g. information regarding the nearest emergency services provider, such as hospitals, police stations and the like;
  h. time; and
  i. an indicator that a system information update that includes the emergency information, or a change in emergency information, is available.

The information may be contained in more than one SIB. For example, information that an emergency exists may be carried in a frequently repeated scheduling unit (SU) such as SU-1. Detailed information may be carried in other SUs.

Alternatively, a fast changing or frequently repeated SIB may be used to carry all the information required for emergency purposes. A WTRU may monitor a downlink channel, such as a broadcast channel (BCH) or a downlink shared channel (DL-SCH) at predefined intervals so that the WTRU may act on the emergency information when the fast changing SIB is received. Additionally, the WTRU may monitor an MIB and/or scheduling information to discover when the SIB for emergency situations will be sent. The RRC in the WTRU may acquire the system information related to the emergency situation. The RRC may then communicate with the NAS and pass the information contained in the emergency situation SIB to the NAS for processing.

At an occurrence of an emergency situation, a WTRU may receive a page to indicate that system information has changed and that emergency information is following. The WTRU may read the updated system information to discover what information is new or changed.

In another embodiment, a 'paging cause' may be added to a paging message/record to indicate that a change in system information change is due to an emergency situation. The WTRU may analyze the paging cause. If it finds that system information has changed, the WTRU may read the SIBs containing the emergency situation information and notify the relevant layers and applications.

Alternatively, a WTRU may receive a page that indicates that there has been an emergency. The paging cause may include an indication that an emergency exists. Upon receiving the page, the WTRU may read the appropriate SIBs, for example. WTRUs that are camped on cells used for emergency-access only may also listen to paging channels for notification of public emergencies.

Alternatively, the WTRU may receive a value, for example, N that is included in the MIB. When the system frame number (SFN) mod N=0 (or every Nth frame) the WTRU may read the DL-SCH to discover any information about a warning being transmitted. The location of the warning SIB may be static when it is transmitted. Alternatively, the location of the warning SIB may be predefined so that the WTRU could appropriately define its reception window. This periodic reading of the SIB could also be performed on occasions when a high risk situation is perceived.

System information resources may be scarce or insufficient to carry extensive text messages that completely describe details of an emergency situation. The amount of information that is carried over the air during the emergency may be reduced, however.

A WTRU may be preloaded or preconfigured with text messages that correspond to particular emergency situations. Examples of the text messages are shown in TABLE 1.

TABLE 1

| Emergency Code | Emergency Description |
| --- | --- |
| 1 | Tsunami |
| 2 | Earthquake |
| 3 | Chemical Spill |

As shown in TABLE 1, each emergency code may correspond to a particular emergency description. An emergency code "1" may correspond to a tsunami warning, a code "2" may correspond to an earthquake warning, and a code "3" may correspond to a chemical spill warning.

Additionally, other forms of preloaded or preconfigured messages, such as multimedia messages, for example, may be utilized. The preconfigured messages may reside on the USIM/Universal Integrated Circuit Card (UICC) of the WTRU or in other non-volatile memory, for example. The WTRU may receive and process preconfigured messages, such as Open Mobile Alliance (OMA) messages, for example. Alternatively, RRC or NAS messages may be used to preconfigure the WTRU with emergency codes and their corresponding textual descriptions.

During an emergency situation, the WTRU may be notified of the emergency situation code via the RRC system information. The WTRU may then perform a lookup using prestored information to determine the text message that corresponds to the emergency situation. The WTRU may then display the text message to the user. The WTRU may also display a multimedia message after look-up. This could be user or operator configured. This may reduce the size of text message information that needs to be transmitted over the air.

The WTRU may receive messages that depend on the specific location of the WTRU. For instance, a tsunami alert may have a different message for a WTRU that is close to the shore, versus a WTRU that is one kilometer from the shore, versus another WTRU that is five kilometers from the shore or on high ground. Differentiated message behavior for the same warning may be controlled by a network entity that would manage the different messages delivery to the eNBs, depending on the eNB location.

RRC messages may be enhanced by using information elements to inform WTRUs of emergency situations and to convey public warning messages. A WTRU may receive an emergency situation notification from an eNB that serves the areas that might be affected by the emergency situation. The RRC layer of the eNB will include the notification of the emergency situation in an RRC message that includes an information element (IE). The IE may include the emergency information set forth above.

Additional RRC messages may be used that include deterministic ASN.1 definitions which may allow the WTRU to parse through the RRC messages faster. The IEs that include emergency information may be designated by the RRC as a high priority and may over-ride the priority of any other RRC message.

NAS messages may be enhanced by using information elements to inform WTRUs of emergency situations and to convey public warning messages. A WTRU may receive an emergency situation notification from an eNB that serves the areas that might be affected by the emergency situation. The NAS layer of the eNB may include the notification of the emergency situation in an NAS message that includes an information element (IE). The IE may include the emergency information set forth above. When the RRC layer receives an NAS emergency message, it may be informed that the message is of an emergent nature and trigger the RRC to treat the message with highest priority.

The emergency message may also be an NAS SMS message or a multimedia messaging services (MMS) message. For example, an MMS service could be provided with a prerecorded message including instructions on what the user should do. The MMS or SMS may be delivered with multi-broadcast/multimedia services (MBMS), for example, on a repeated basis to ensure that users are reached.

The paging mechanism may be used to notify WTRUs of emergency situations. Paging may be used to notify WTRUs of terminating, high-priority signaling, with RRC or NAS messages and/or IEs conveying the public warning information. Optionally, paging may be used to notify WTRUs of emergency notification signaling at regular priority, with data radio bearers conveying the public warning information. The paging message itself conveys the emergency information.

Once a WTRU reads and analyzes a paging cause, subsequent actions may depend on the RRC state and if the WTRU received the page on a suitable cell. A WTRU in an RRC_IDLE state may first establish an RRC connection by performing a random access procedure on the random access channel (RACH). However, if the WTRU is in RRC_CONNECTED, it may not need to perform the random access procedure on the RACH. After the random access procedure is completed, a WTRU may monitor the physical downlink control channel (PDCCH) for downlink resource assignment.

In the downlink, the WTRU may receive an emergency notification on a signaling radio bearer (SRB) as an NAS message or an RRC messages. The WTRU may also receive the emergency notification on a data radio bearer (DRB) as a user data application.

If the emergency notification is received as an RRC message, it may be carried on an SRB designed for high priority messages, for example, SRB2. Other SRBs may be used as well. If the emergency notification is sent as NAS messages, an SRB designed to carry NAS messages, such as SRB1, for example, may be used. The use of other SRBs, such as SRB2 or SRB0 is also possible.

If the emergency notification is sent on a DRB as data, the highest priority DRB may be used so that the highest priority DRB may be scheduled before all other DRBs with no bit-rate constraint. The WTRU may receive the downlink transmissions on the allocated resources and forward the emergency notification message to the relevant upper layer.

There may be times when a WTRU may not be allowed to register in a particular system. However, for an emergency situation, a system may accept registration for the emergency notification only. This may occur during an "emergency period". During the emergency period the WTRU may remain registered so that the WTRU may be paged. This may require the use of the Mobility Management Entity (MME). If, under normal circumstances a WTRU is not allowed to register, it may perform registration or attachment to the network whereby the registration/attachment message indicates that the reason is to be able to receive emergency notification messages.

The allowance of a normally barred WTRU to register may be indicated on the system information of the network. The WTRU may receive, for example, an indicator, that may be as small as one bit, to inform the WTRU whether it is allowed to register to receive an emergency notification. The WTRUs may register based on the indicator in the system information. Therefore, for example, a WTRU that has not yet performed registration/attachment may perform one or more of the procedures related registration/attachment based on the WTRU reading system information indicating that an emergency notification may be communicated.

Figure 8:
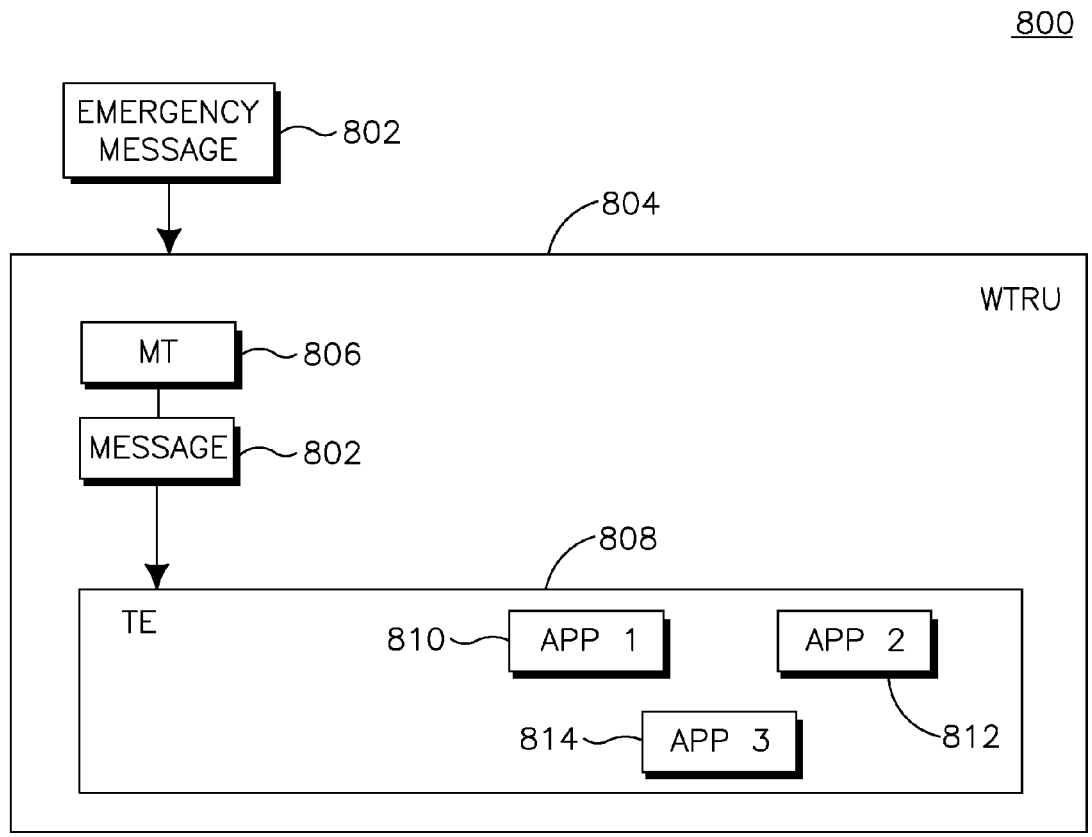
FIG. 8 is a block diagram of WTRU emergency procedures in accordance with one embodiment.

Once the WTRU is notified of a public warning message, the WTRU may prepare an emergency number to dial and may prompt the user. Such enhanced functionality may help the user avoid panic. FIG. 8 is a block diagram of WTRU emergency procedure 800 in accordance with one embodiment. An emergency message 802 is received at the WTRU 804. The WTRU MT 806 receives the emergency notification message. The message may include a phone number or an Internet address to contact. The WTRU MT 806 conveys the message 802 to the WTRU TE 808 via primitives or AT commands, such as an 'MT status' and 'response' primitive or AT command, for example. The primitive or AT command may indicate that an emergency has occurred and that a warning is required. The primitive or AT command may also provide details on the emergency, with a phone number or an Internet address to contact for further information.

Upon receiving the primitive or AT command, a first application 810 may run on the TE 808 and warns the user by playing a special sound, ring or beep that indicates to the user that an emergency message has been received. The warning sound may be at a very high volume.

A second application 812 that runs on the TE 808 may look up an appropriate emergency phone number to be dialed, such as a number received with the warning message or a preconfigured phone number such as 911, for example. The second application 812 may prompt the user to dial the number. For example, the application could display a message on the display screen of the WTRU that prompts a user to dial 911. If the user confirms the dial request, the second application 812 will instruct the WTRU MT 806, using an AT command, to dial 911.

Furthermore, once the emergency notification 802 is received, the WTRU 804 may run a third application 814 that prepares a message that contains the WTRUs position information. The message may be populated using a GPS, cell/tracking area info or any other positioning application. Once the WTRU MT 806 conveys the emergency message 802 to the WTRU TE 808, the third application 814 that may run on the TE 808, creates a message that contains the WTRU's position information, such as coordinates, for example. The position information may be obtained from a GPS device, cell/tracking area info or any other positioning application. The third application 814 may prompt the user for instruction. The third application 814 may use AT commands to instruct the WTRU MT 806 to send a message containing the WTRU's position information. The message may be sent over an SRB as an RRC or NAS message, for example, or over a DRB. The WTRU may also use an assisted GPS, based in the control plane or secure user plane (SUPL).

Once the emergency notification is received by the WTRU, the WTRU may generate and sends a tracking area update (TAU) message to an eNB. This operation may be done within the WTRU MT 806. The TAU message may include, as a 'cause', an indication that the WTRU transmitted the TAU in response to an emergency situation message. The network may utilize the TAU to determine which cells or areas the WTRU is located in, and to determine the WTRU's position. The network may then send more specific or follow-up messages in addition to the original warning message targeting specific WTRUs in specific cells.

A WTRU may utilize a higher access priority, such as higher RACH priority or higher access class (AC), for example, when performing an access procedure in any of the situations associated with receiving the emergency situation notification, including, for example, preparing a number to dial, sending position information, sending a TAU, or other actions related to receiving the emergency notification. This will allow the prioritization of those actions by the WTRU.

Figure 9:
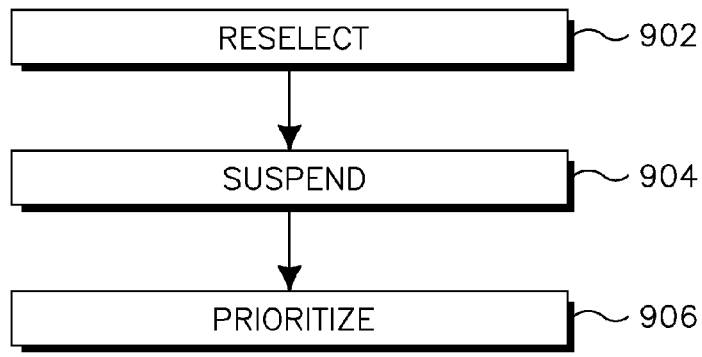
FIG. 9 is a block diagram of WTRU emergency procedure in accordance with one embodiment.

FIG. 9 is a block diagram of WTRU emergency procedure 900 in accordance with one embodiment of the present invention. After receiving the emergency situation notification, the WTRU may reselect 902 to a different cell or different radio access technology (RAT). The WTRU may autonomously reselect to a cell offering circuit switched (CS) services. The WTRU may also suspend procedures 904. The WTRU may suspend all procedures, or may suspend a subset of all procedures. The WTRU may then prioritize the access class 906 of the next or any new RRC connection requests initiated by the user. The user may be given the option of prioritizing a connection as an emergency call. This may allow the user to communicate with destinations other than emergency destinations. This option may only be available to the user when the terminal is aware of an ongoing emergency and may limit the user to a certain number of non-emergency contacts.

During a public emergency, the network may wish to conserve radio resources by reserving usage of bandwidth to emergency calls, internet access and the like. To achieve this, the network may interrupt ongoing connections deemed to be of a lower priority, such as a high speed video download, for example. The network may interrupt the ongoing service by sending an NAS/RRC message dedicated to service interruption in an emergency situation. Optionally, the network may send an IE in an NAS/RRC message. The message may indicate to the terminal that the cause for the connection to be dropped is an ongoing emergency. The message may provide further information about the emergency. This procedure may be utilized by the network to reject any new RRC CONNECTION REQUEST/NAS SERVICE REQUEST that requests QoS for a service that is incompatible with those needed for an emergency call or some other basic service, such as internet access, for example. The network may also interrupt the ongoing service by suspending, tearing down or releasing radio bearers that are deemed to be low priority due to the emergency situation.

In the event of an ongoing emergency situation, it may be desirable to restrict the number of connection requests to only those for emergency services or other service classes meeting the access restrictions. When a user requests a service that is not an emergency call the TE, with assistance from the MT, may remind the user that a public emergency is ongoing. The TE may inform the user that the session may not be setup and/or may be rejected. This may be done using an application. MT primitives and AT commands may achieve this. The TE may request that the user confirm his/her intention to proceed with the connection request. The TE may choose not to perform the connection request.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed:

1. A method implemented by a wireless transmit receive unit (WTRU), the method comprising:
   the WTRU receiving a paging message while the WTRU is in one of a radio resource control (RRC) CONNECTED state or an RRC IDLE state, the paging message comprising an emergency notification indication;
   the WTRU receiving a system information block (SIB) type-1 in response to receiving the paging message including the emergency notification indication, wherein the SIB type-1 comprises scheduling information for at least one additional SIB, and the at least one additional SIB comprises emergency information associated with the emergency notification indication;
   the WTRU receiving the at least one additional SIB in accordance with the scheduling information included in the SIB type-1; and
   the WTRU outputting at least one of an audio or visual alert in response to receiving the emergency information.

2. The method as in claim 1, wherein the WTRU receiving the SIB type-1 is performed in response to the emergency notification indication being included in the paging message.

3. The method as in claim 1, wherein the SIB type-1 is transmitted by an evolved Node-B (eNB) at a periodicity that is greater than a periodicity used for transmitting other types of SIBs.

4. The method as in claim 1, wherein the at least one additional SIB comprises at least two SIBs, a first SIB of the at least two SIBs comprises information regarding a type of emergency, and a second SIB of the at least two SIBs comprises a text message describing a recommend action to take regarding the emergency.

5. The method as in claim 1, wherein the emergency information included in the at least one additional SIB comprises an indication of a type of emergency.

6. A wireless transmit receive unit (WTRU) comprising:
   a receiver configured to receive a paging message while the WTRU is in one of a radio resource control (RRC) CONNECTED state or an RRC IDLE state, the paging message comprising an emergency notification indication;
   a processor configured to:
      acquire, via the receiver, a first system information block (SIB) in response to the paging message including the emergency notification indication, wherein the first SIB comprises scheduling information for at least one additional SIB,
      acquire, via the receiver, the at least one additional SIB in accordance with the scheduling information, the at least one additional SIB comprising emergency information associated with the emergency notification indication; and
   a display configured to display a visual alert based on the emergency information.

7. The WTRU as in claim 6, wherein the first SIB corresponds to a long term evolution SIB type-1.

8. The WTRU as in claim 7, wherein the SIB type-1 is transmitted by an evolved Node-B (eNB) at a periodicity that is greater than a periodicity used for transmitting other types of SIBs.

9. The WTRU as in claim 6, wherein the at least one additional SIB comprises at least two SIBs, a first SIB of the at least two SIBs comprises information regarding a type of emergency, and a second SIB of the at least two SIBs comprises an emergency description.

10. The WTRU as in claim 6, wherein the emergency information associated with the emergency notification indication comprises an indication of a type of emergency.

11. The WTRU as in claim 6, further comprising a speaker configured to output a sound at high volume based on the WTRU receiving the emergency information.

12. The WTRU as in claim 6, wherein the processor is configured to continue to monitor a physical downlink control channel (PDCCH) without performing a random access channel (RACH) procedure after receiving the paging message based on the WTRU being in the RRC CONNECTED state when the paging message is received.

13. The WTRU as in claim 6, wherein the processor is configured to perform a random access channel (RACH) procedure after receiving the paging message when the WTRU is in the RRC IDLE state when the paging message is received.

14. A wireless transmit receive unit (WTRU) comprising:
a receiver configured to receive a paging message while the WTRU is in one of a radio resource control (RRC) CONNECTED state or an RRC IDLE state, the paging message comprising an emergency notification indication;
a processor configured to:
acquire, via the receiver, a first system information block (SIB) in response to the paging message including the emergency notification indication, wherein the first SIB comprises scheduling information for at least a second SIB,
acquire, via the receiver, the second SIB in accordance with the scheduling information, the second SIB comprising emergency information associated with the emergency notification; and
a speaker configured to output a sound based on the WTRU receiving the emergency information.

15. The WTRU as in claim 14, wherein the first SIB corresponds to a long term evolution SIB type-1.

16. The WTRU as in claim 15, wherein the SIB type-1 is transmitted by an evolved Node-B (eNB) at a periodicity that is greater than a periodicity used for transmitting other types of SIBs.

17. The WTRU as in claim 14, wherein the emergency information associated with the emergency notification indication comprises an indication of a type of emergency.

18. The WTRU as in claim 14, further comprising a display configured to display a text message associated with the emergency information.

19. The WTRU as in claim 14, wherein the processor is configured to continue to monitor a physical downlink control channel (PDCCH) without performing a random access channel (RACH) procedure after receiving the paging message based on the WTRU being in the RRC CONNECTED state when the paging message is received.

20. The WTRU as in claim 14, wherein the processor is configured to perform a random access channel (RACH) procedure after receiving the paging message when the WTRU is in the RRC IDLE state when the paging message is received.

* * * * *